United States Patent [19]
Tobisawa et al.

[11] Patent Number: 4,664,016
[45] Date of Patent: May 12, 1987

[54] SUPPLY PASSAGE FOR BRAKE BOOSTER OF POSITIVE PRESSURE TYPE

[75] Inventors: Yoshio Tobisawa, Higashimatsuyama; Hitoshi Kubota; Masatoshi Nakamura, both of Atsugi, all of Japan

[73] Assignee: Jidoshakiki Co., Ltd., Tokyo, Japan

[21] Appl. No.: 701,479

[22] Filed: Feb. 14, 1985

[30] Foreign Application Priority Data

Feb. 15, 1984 [JP] Japan ............... 59-20375[U]

[51] Int. Cl.⁴ .............................................. F15B 9/10
[52] U.S. Cl. .................. 91/369 A; 91/376 R; 92/102
[58] Field of Search ............ 91/6, 369 R, 369 A, 91/376 R, 49; 92/102, 99

[56] References Cited
U.S. PATENT DOCUMENTS

| | | | |
|---|---|---|---|
| 2,377,699 | 6/1945 | Klimkiewicz | 91/376 R |
| 2,520,374 | 8/1950 | Rockwell | 91/376 R |
| 2,792,686 | 5/1957 | Ingres | 91/376 R |
| 3,321,916 | 5/1967 | Cripe | 91/376 R |
| 3,434,388 | 3/1969 | Julow et al. | 91/6 |
| 3,789,735 | 2/1974 | Tam et al. | 91/47 |
| 3,880,049 | 4/1975 | Grabb et al. | 91/376 R |
| 3,921,501 | 11/1975 | Rosback | 91/376 R |
| 4,493,243 | 1/1985 | Horibe | 91/376 R |

FOREIGN PATENT DOCUMENTS 113077 10/1974 Japan .
167547 12/1981 Japan .

Primary Examiner—Abraham Hershkovitz
Attorney, Agent, or Firm—Flynn, Thiel, Boutell & Tanis

[57] ABSTRACT

A brake booster of positive pressure type includes a valve mechanism to which a positive pressure such as compressed air from a source located externally of a shell is fed for switching a flow path, through a conduit disposed within a constant pressure chamber disposed forwardly of a power piston and a supply passage which is formed in a valve body. The supply passage according to the invention comprised a radial passage which extends radially outward through the valve body from a shank portion thereof, and an axial passage which communicates with the radial passage, which an opening of the radial passage into the peripheral surface of the valve body being closed by a seal member which may be formed of an elastic material such as rubber. The seal member is covered by part of the power piston. This construction permits the supply passage to be formed in an inexpensive manner as compared with a formation of a supply passage which extends obliquely through the valve body. The power piston reliably prevents the withdrawal of the seal member from the radial passage.

8 Claims, 4 Drawing Figures

4,664,016

SUPPLY PASSAGE FOR BRAKE BOOSTER OF POSITIVE PRESSURE TYPE

FIELD OF THE INVENTION

The invention relates to a brake booster of positive pressure type in which a positive pressure such as compressed air is supplied to a variable pressure chamber through a supply passage which is formed in a valve body thereof.

DESCRIPTION OF THE PRIOR ART

A brake booster is known in the art having a variable pressure chamber into which a positive pressure as may be defined by compressed air is supplied and also having a constant pressure chamber into which the atmospheric pressure or a negative pressure is supplied so that a pressure differential between the positive pressure and the atmospheric pressure or the negative pressure acts upon a power piston (see Japanese Laid-Open Patent Application No. 167,547/1981 or Japanese Laid-Open Patent Application No. 113,077/1974 (U.S. Pat. No. 3,789,735), for example). With a brake booster of the type described, the absolute value of the positive pressure can be made far greater than the value of the negative pressure, resulting in an advantage that a high booster ratio can be obtained while maintaining the reduced diameter of the power piston or without increasing the size of the brake booster.

However, it is necessary to supply a positive pressure to the variable pressure chamber of the brake booster mentioned above. A conventional practice has generally been to supply such positive pressure from the rear side of the brake booster as is commonly done in an ordinary brake booster of negative pressure type. In this instance, a conduit which feeds the positive pressure must be passed through an opening formed in a toe board from an engine room before the conduit is connected to the rear potion of the brake booster, resulting in a disadvantage that the connection requires an inefficient operation.

To overcome this difficulty, there has been proposed an arrangement in which the conduit is disposed within the constant pressure chamber to provide a connection through the conduit between a source of fluid pressure and a supply passage which is formed in a valve body in the region of the shank portion of a power piston so as to introduce a positive pressure from the supply passage into a valve mechanism which switches a flow path. This arrangement brings the point of connection of the conduit to the brake booster to a forward location, eliminating the described disadvantage. However, the connection of the conduit with the valve mechanism which is disposed in the shank portion of the valve body will be made adjacent to the outer periphery of the valve body because an output shaft is disposed in the shank portion of the valve body, and thus it follows that the supply passage which provides a communication between the conduit and the valve mechanism must extend through the valve body along an oblique path. Forming a supply passage extending obliquely through the valve body requires a mold of a complex configuration to manufacture such valve body, resulting in an expensive one which is undesirable.

The formation of an obliquely extending supply passage in the valve body can be avoided, by providing a radial passage which extends radially outward through the valve body from the shank portion thereof and an axial passage which communicates with the radial passage. With this construction of the supply passage, it can be manufactured in an inexpensive manner as compared with the formation of an obliquely extending passage.

In the described arrangement, it will be noted, however, that the opening of the radial passage which opens into the valve body must be closed with a seal member. In particular, if such arrangement is used in a brake booster of positive pressure type in which a positive pressure is fed into the supply passage, there is a high likelihood that the seal member may be pushed out by the action of the positive pressure. Accordingly, a reliable seal must be achieved by utilizing a tapered plug or steel ball, and there still remains the possibility that the seal member may be disengaged if it is of an expensive construction.

SUMMARY OF THE INVENTION

It is an object of the invention to provide a brake booster of positive pressure type which permits the supply passage to be constructed in an inexpensive manner and which eliminates the likelihood of disengagement of a seal member.

According to the invention, there is provided a brake booster of positive pressure type in which a supply passage is formed by a combination of a radial passage and a axial passage so as to be constructed in an inexpensive manner. An opening of the radial passage into a valve body is closed by a seal member which is arranged to be covered by part of a power piston, which thus effectively prevents the disengagement of the seal member from the radial passage. Accordingly, a reliable seal can be maintained which is free from the likelihood of disengagement if a seal member of an inexpensive construction such as may be provided by rubber is used.

Above and other objects, features and advantages of the invention will become apparent from the following description with reference to the attached drawings.

DETAILED DESCRIPTION OF EMBODIMENTS

Figure 1:
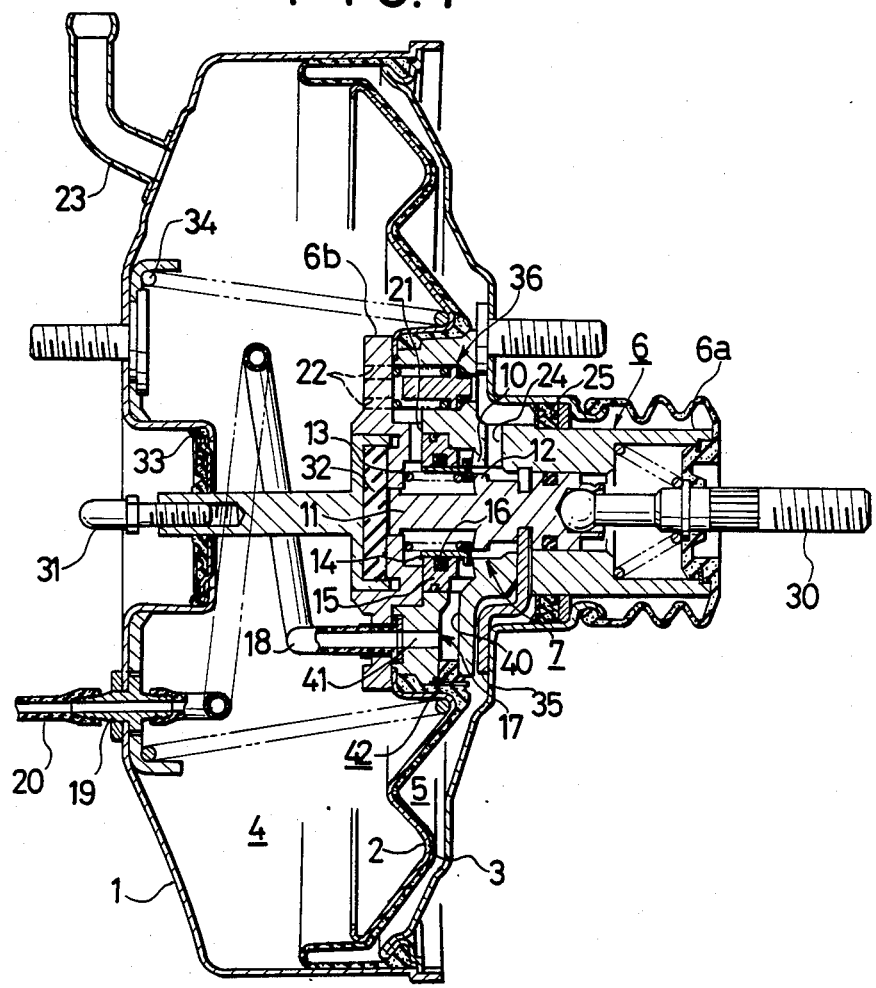
FIG. 1 is a longitudinal section of one embodiment of the invention.

Referring to the drawings, several embodiments of the invention will now be described. Referring to FIG. 1, it will be noted that a brake booster includes a shell 1 in which a power piston 2 is slidably disposed. A diaphragm 3 is applied to the back surface of the power piston 2. The combination of the power piston 2 and the diaphragm 3 divides the interior of the shell 1 into a fowardly located, constant pressure chamber 4 and a rearwardly located, variable pressure chamber 5. The power piston 2 has a shank portion which is connected with a valve body 6 which internally houses a valve mechanism 7 operating to switch a flow path.

The valve mechanism 7 comprises a first valve seat 10 which is formed on the valve body 6, a second valve seat 12 formed on a valve plunger 11, and a valve element 14 which is adapted to be seated upon either valve seat 10 or 12 from the front side of the power piston 2 or from the left, as viewed in FIG. 1, under the resilience of a spring 13. The valve element 14 is formed by a tubular member and the inner and the outer side thereof are sealed by a seal member 16 carried by a holder 15 which forms part of the valve body 6. A region outside the seal defined by the engagement between the valve element 14 and the first valve seat 10 communicates with a supply passage 17 which is formed in the valve body 6. The supply passage 17 communicates with a source of fluid pressure such as a compressed air tank, not shown, for example, through a flexible helical conduit 18 connected to the valve body 6, a connector 19 attached to the shell 1 and an external conduit 20.

On the other hand, a region inside the seal defined by the engagement between the valve element 14 and the second valve seat 12 communicates with the constant pressure chamber 4 through a radial passage 21 and axial passage 22. The constant pressure chamber 4 communicates with a source of negative pressure such as an intake manifold of an engine through a negative pressure introduction port 23 formed in the shell 1. A region located intermediate the seal defined between the valve element 14 and the first valve seat 10 and the seal defined between the valve element 14 and the second valve seat 12 communicates with the variable pressure chamber 5 through a radial passage 24 formed in the valve body 6. It is to be noted that the variable pressure chamber 5 has its hermetic seal against the exterior maintained by a seal member 25 which is disposed to allow the valve body 6 to extend slidably therethrough.

The valve plunger 11 which forms part of the valve mechanism 7 is connected to an input shaft 30 which is mechanically interlocked with a brake pedal, not shown. The front end face of the valve plunger 11 is disposed in opposing relationship with a reaction disc 32 received in a recess formed in one end of an output shaft 31. The output shaft 31 extends through a seal member 33 and projects externally of the shell 1 for connection with the piston of a master cylinder, now shown.

It will also be noted that a return spring 34 normally maintains the power piston 2 and the valve body 6 in their non-operative positions shown. A key member 35 serves preventing the valve plunger 11 from being withdrawn from the valve body 6, and in the non-operative position shown, abuts against the internal surface of the shell 1 to limit a free movement of the valve plunger 11 to the right with respect to the valve body 6 so that whenever the input shaft 30 and the valve plunger 11 are operated subsequently, the valve mechanism is able to switch the fluid circuit immediately. In the embodiment shown, the valve body 6 is provided with a relief valve 36 which relieves the positive pressure within the variable pressure chamber 5 into the constant pressure chamber 4 when the pressure within the variable pressure chamber 5 exceeds a given value.

Figure 2:
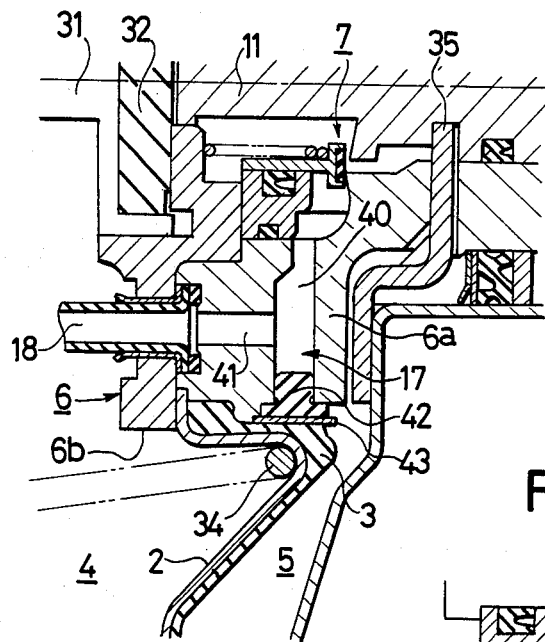
FIG. 2 is an enlarged cross section of part of the embodiment shown in FIG. 1.

As shown in enlarged form in FIG. 2, in the embodiment shown, the supply passage 17 comprises a radial passage 40 which extends radially outward through the valve body 6 from the shank portion thereof and an axial passage 41 which communicates with the radial passage 40, with the opening of the radial passage 40 into the peripheral surface of the valve body 6 being closed by a seal member 42 which is formed of an elastic material such as rubber.

The seal member 42 is gibbous in cross section having an external portion of an increased diameter, which is thus prevented from entering the radial passage 40. Part of the power piston 2 overlies the seal member 42 with the diaphragm 3 and a plate 43 interposed therebetween, thus preventing the seal member 42 from being externally withdrawn from the radial passage 40. It is to be noted that the power piston 2 is secured in place by being held between a main portion 6a of the valve body 6 and a hub 6b connected to the main portion 6a.

With the described arrangement, when a brake pedal, not shown, is depressed to move the input shaft 30 and the valve plunger 11 to the left, the second valve seat 12 formed on the valve plunger 11 will be engaged with the valve element 14 to interrupt a communication between the radial passage 21 and 24 and thus interrupts the communication between the variable pressure chamber 5 and the constant pressure chamber 4. At the same time, the valve element 14 is displaced away from the first valve seat 10, providing a communication between the supply passage 17 and the variable pressure chamber 5. As a result, a positive pressure which is introduced into the supply passage 17 from a source of fluid pressure through the external conduit 20, the connector 19 and the helical conduit 18 is also fed into the variable pressure chamber 5, enabling the pressure differential across the power piston 2 to drive it forward against the resilience of the return spring 34, generally in the similar manner as occurs in the conventional brake booster.

When the brake pedal is now released under this braking condition, the valve element 14 of the valve mechanism 7 will be seated upon the first valve seat 10 to interrupt the communication between the variable pressure chamber 5 and the supply passage 17 while providing a communication between the variable pressure chamber 5 and the constant pressure chamber 4 as a result of its movement away from the second valve seat 12, thus allowing the power piston 2 to be returned to its original non-operative position under the resilience of the return spring 34.

When the key member 35 abuts against the shell as the power piston 2 retracts, the valve plunger 11 which is mechanically interlocked therewith ceases to retract while both the power piston 2 and the valve body 6 continue to retract until the second valve seat 12 formed on the valve plunger 11 moves closed to the valve element 14 and the clearance therebetween becomes substantially equal to zero, whereupon the valve body 6 abuts against the key member 35 to cease its movement. Accordingly, when the input shaft 30 is driven forward for the next time, the valve mechanism 7 is immediately operable to switch the flow path.

During the operation of the brake booster, the pressure within the variable pressure chamber 5 normally does not exceed a preset value of the relief valve 36. However, if the pressure exceeds the preset value, such pressure force the relief valve 36 open to find its way into the constant pressure chamber 5, thus preventing any damage caused to the brake booster by an undesirable rise in the pressure within the variable pressure chamber 5.

As described above, the seal member 42 which closes the opening of the radial passage 40 is covered by part of the power piston 2 with the plate 43 and the diaphragm 3 interposed therebetween, and hence though the positive pressure introduced into the radial passage tends to force the seal member 42 outward, the withdrawal of the seal member 42 from the radial passage 40 is prevented in a reliable manner.

Figure 3:
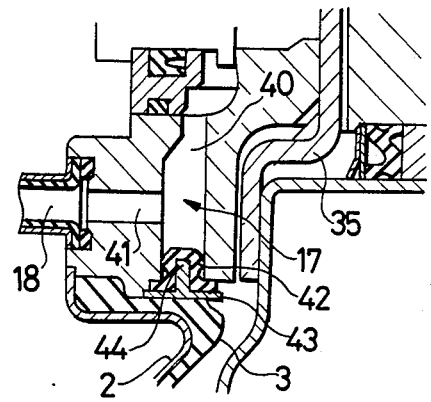
FIGS. 3 and 4 are cross sections of part of other embodiments of the invention.
Figure 4:
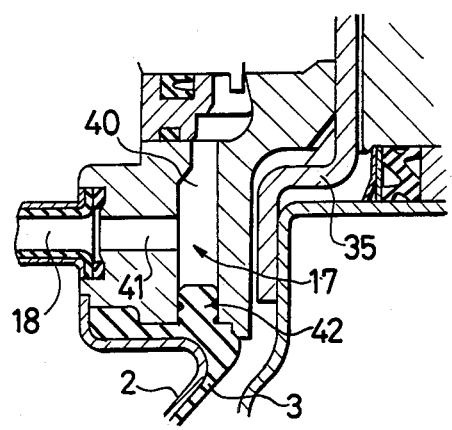

FIGS. 3 and 4 show other embodiments of the invention. In the embodiment shown in FIG. 3, the plate 43 which is interposed between the diaphragm 3 and the seal member 42 is provided with an integral projection 44 which is a press fit into the seal member 42, thus providing an integral connection between the seal member 42 and the plate 43. In the embodiment shown in FIG. 4, the seal member 42 is integrally formed with the diaphragm 3.

As further alternatives, the plate 43 may be omitted, or the seal member 42 may be directly covered by part of the power piston 2 without interposing the diaphragm 3 or the plate 43 therebetween.

While the invention has been shown and described above in connection with several embodiments thereof, it should be understood that a number of changes, modifications and substitutions therein will readily occur to one skilled in the art from the above disclosure without departing from the scope and the spirit of the invention as defined by the appended claims.

What is claimed is:

1. A supply passage for a brake booster of positive pressure type including a power piston slidably disposed within a shell, a diaphragm disposed on the rear side of the power piston as viewed in the direction in which it is operated, a valve body connected with the power piston and formed separate from the power piston, a valve mechanism received within the valve body, a combination of a constant pressure chamber and a variable pressure chamber which are defined on the front and the rear side of the power piston as viewed in the direction of its operation, a conduit disposed within the constant pressure chamber to provide a communication between a source of fluid pressure which is located externally of the shell and a supply passage formed in the valve body to introduce a positive pressure into the valve mechanism, and an input shaft for operating the valve mechanism, to switch a flow path to enable the positive pressure introduced into the supply passage to be fed into the variable pressure chamber to allow the power piston to be driven forwardly; the supply passage comprising a radial passage extending radially outward through the valve body and having a radially outer end opening in the periphery of the valve body, and an axial passage communicating with the radial passage, the radially outer end opening of said radial passage being closed by a seal member, means positively blocking withdrawal of the seal member from the radial passage, said means comprising a radially inner part of the power piston fixed with respect to and extending longitudinally along the periphery of the valve body and lying close radially outboard of said seal member at said radially outer end opening of said radial passage.

2. A supply passage according to claim 1 in which the valve body includes a main portion and a hub connected therewith, the power piston inner periphery being held between the main portion and the hub of the valve body near the outer end of said radial passage.

3. A supply passage for a brake booster of positive pressure type including a power piston slidably disposed within a shell, a diaphragm disposed on the rear side of the power piston as viewed in the direction in which it is operated, a valve body connected with the power piston and formed separate from the power piston, a valve mechanism received within the valve body, a combination of a constant pressure chamber and a variable pressure chamber which are defined on the front and the rear side of the power piston as viewed in the direction of its operation, a conduit disposed within the constant pressure chamber to provide a communication between a source of fluid pressure which is located externally of the shell and a supply passage formed in the valve body to introduce a positive pressure into the valve mechanism, and an input shaft for operating the valve mechanism, to switch a flow path to enable the positive pressure introduced into the supply passage to be fed into the variable pressure chamber to allow the power piston to be driven forwardly; the supply passage comprising a radial passage extending radially outward through the valve body and an axial passage communicating with the radial passage, an opening of the radial passage into the valve body being closed by a seal member, which is in turn covered by part of the power piston, thereby preventing the seal member from being withdrawn from the radial passage, in which part of the power piston covers the seal member with a part of said diaphragm and a plate interposed therebetween, thereby enabling the plate to prevent the withdrawal of the seal member from the radial passage.

4. A supply passage according to claim 3 in which the plate has a projection which is a press fit into the seal member and which provides an integral connection between the plate and the seal member.

5. A supply passage for a brake booster of positive pressure type including a power piston slidably disposed within a shell, a diaphragm disposed on the rear side of the power piston as viewed in the direction in which it is operated, a valve body connected with the power piston and formed separate from the power piston, a valve mechanism received within the valve body, a combination of a constant pressure chamber and a variable pressure chamber which are defined on the front and the rear side of the power piston as viewed in the direction of its operation, a conduit disposed within the constant pressure chamber to provide a communication between a source of fluid pressure which is located externally of the shell and a supply passage formed in the valve body to introduce a positive pressure into the valve mechanism, and an input shaft for operating the valve mechanism, to switch a flow path to enable the positive pressure introduced into the supply passage to be fed into the variable pressure chamber to allow the power piston to be driven forwardly; the supply passage comprising a radial passage extending radially outward through the valve body and an axial passage communicating with the radial passage, an opening of the radial passage into the valve body being closed by a seal member, which is in turn covered by part of the power piston, thereby preventing the seal member from being withdrawn from the radial passage, in which part of the power piston covers the seal member with a part of said diaphragm interposed therebetween, whereby the diaphragm prevents the withdrawal of the seal member from the radial passage.

6. A supply passage according to claim 5 in which the seal member is integrally formed with the diaphragm.

7. A brake booster of positive pressure type including a power piston slidably disposed within a shell, a diaphragm disposed on the rear side of the power piston, a valve body connected to the inner periphery of the power piston and formed separate from the power piston, a valve mechanism received within the valve body, a combination of a constant pressure chamber and a variable pressure chamber which are defined respectively on the front side and the rear side of the power piston, conduit means disposed within the constant pressure chamber communicating between a source of fluid pressure located externally of the shell and a supply passage formed in the valve body for introducing a positive pressure into the valve mechanism, and input shaft means operatively connected to the valve mechanism to switch a flow path for feeding of the positive pressure in the supply passage into the variable pressure chamber and therewith for forwardly driving the power piston, the supply passage comprising a radial passage opening radially outward through the valve body and an axial passage communicating with the radial passage intermediate the ends of the radial passage, a seal member located at and closing the radially outward opening part of the radial passage in the valve body, a part of said power piston lying closely adjacent to said valve body at said radially outward opening part of said radial passage, said seal member being covered by said part of the power piston, said part of said power piston positively blocking withdrawal of the seal member from the radially outward opening part of the radial passage.

8. A supply passage according to claim 7 in which said power piston has a radially inner periphery sandwiched axially between the main portion and hub of the valve body axially near the radially outer end of the radial passage, said power piston continuing axially along the periphery of said valve body to lie close radially outboard of said seal member, said power piston continuing further by turning radially outward toward said shell and away from said valve body.

* * * * *